United States Patent
Mori

(10) Patent No.: US 12,445,425 B2
(45) Date of Patent: Oct. 14, 2025

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: BROTHER KOGYO KABUSHIKI KAISHA, Nagoya (JP)

(72) Inventor: Kyohei Mori, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 169 days.

(21) Appl. No.: 18/503,601

(22) Filed: Nov. 7, 2023

(65) Prior Publication Data

US 2024/0171562 A1 May 23, 2024

(30) Foreign Application Priority Data

Nov. 17, 2022 (JP) .................. 2022-184110

(51) Int. Cl.
*H04L 9/40* (2022.01)
*H04L 9/32* (2006.01)

(52) U.S. Cl.
CPC ............ *H04L 63/08* (2013.01); *H04L 9/3213* (2013.01); *H04L 63/102* (2013.01)

(58) Field of Classification Search
CPC ..... H04L 63/08; H04L 9/3213; H04L 63/102; H04L 9/32; H04L 63/0807; G06F 21/135
See application file for complete search history.

(56) References Cited

U.S. PATENT DOCUMENTS

2018/0088879 A1* 3/2018 Tonegawa ............. G06F 3/1238
2019/0068595 A1* 2/2019 Mochizuki ............ G06F 21/608

FOREIGN PATENT DOCUMENTS

JP 2018-084979 A 5/2018
JP 2022-054025 A 4/2022

OTHER PUBLICATIONS

Akrom Hawaemanoh et al., Development of Account Management System for Secure Wireless Authentication, 2022, pp. 1-5. (Year: 2022).*
Takamichi Saito et al., An Authorization Scheme Concealing Client's Access from Authentication Server, 2016, pp. 1-6. (Year: 2016).*

* cited by examiner

*Primary Examiner* — Luu T Pham
*Assistant Examiner* — Canh Le
(74) *Attorney, Agent, or Firm* — Scully, Scott, Murphy & Presser, P.C.

(57) ABSTRACT

A communication device, may comprise a controller configured to: in response to receiving a predetermined signal from a terminal device, send a parameter request to a specific server, wherein the parameter request is for requesting a parameter for communication with an authentication server; receive the parameter from the specific server; send an authentication information request by using the parameter received from the specific server; in a case where a specific condition is met, receive a authentication information from the authentication server as a response to the authentication information request, wherein the specific condition is that the terminal device, which is a sender of the predetermined signal, is logged in at least one of the authentication server or a service server by using specific account information; and communicate target data with the service server.

9 Claims, 5 Drawing Sheets

COMMUNICATION DEVICE AND NON-TRANSITORY COMPUTER-READABLE RECORDING MEDIUM STORING COMPUTER-READABLE INSTRUCTIONS FOR COMMUNICATION DEVICE

REFERENCE TO RELATED APPLICATION

This application claims priority to Japanese Patent Application No. 2022-184110 filed on Nov. 17, 2022. The entire content of the priority application is incorporated herein by reference.

BACKGROUND ART

The OAuth 2.0 device authorization grant, which may also be called the device flow, is known that enables a printer to obtain an authentication token by operation on a smart phone. In the device flow, the printer communicates with an authorization server device to obtain the authentication token from the authorization server device.

DESCRIPTION

A communication device, such as a printer, needs various parameters to communicate with an authorization server device. For example, the communication device may store such parameters in advance. In this configuration, it is necessary to provide a storage area in the communication device to store the parameters in advance.

The disclosure herein provides a technology for obtaining authentication information from an authentication server without having to provide a storage area in a communication device to store parameters in advance.

A communication device disclosed herein may comprise a controller configured to: in response to receiving a predetermined signal from a terminal device, send a parameter request to a specific server, wherein the parameter request is for requesting a parameter for communication with an authentication server, the specific server is different from the authentication server, the authentication server is configured to supply the communication device with authentication information for the communication device to communicate with a service server, and the service server is configured to supply a specific service to an user of the communication device; receive the parameter from the specific server as a response to the parameter request; send an authentication information request for requesting the authentication information to the authentication server by using the parameter received from the specific server; in a case where a specific condition is met, receive the authentication information from the authentication server as a response to the authentication information request, wherein the specific condition is that the terminal device, which is a sender of the predetermined signal, is logged in at least one of the authentication server or the service server by using specific account information, and wherein in a case where the specific condition is not met, the authentication information is not received from the authentication server; and communicate target data with the service server by using the authentication information received from the authentication server.

According to the above configuration, the communication device receives the parameter from the specific server and sends the authentication information request to the authentication server by using the parameter. That is, the parameter needs only be stored in the specific server and need not be stored in advance in the communication device. The communication device can obtain the authentication information from the authentication server without a storage area provided in the communication device to store the parameter in advance.

A computer program for implementing the communication device described above and a computer-readable storage medium storing the computer program are also novel and useful.

Figure 1:
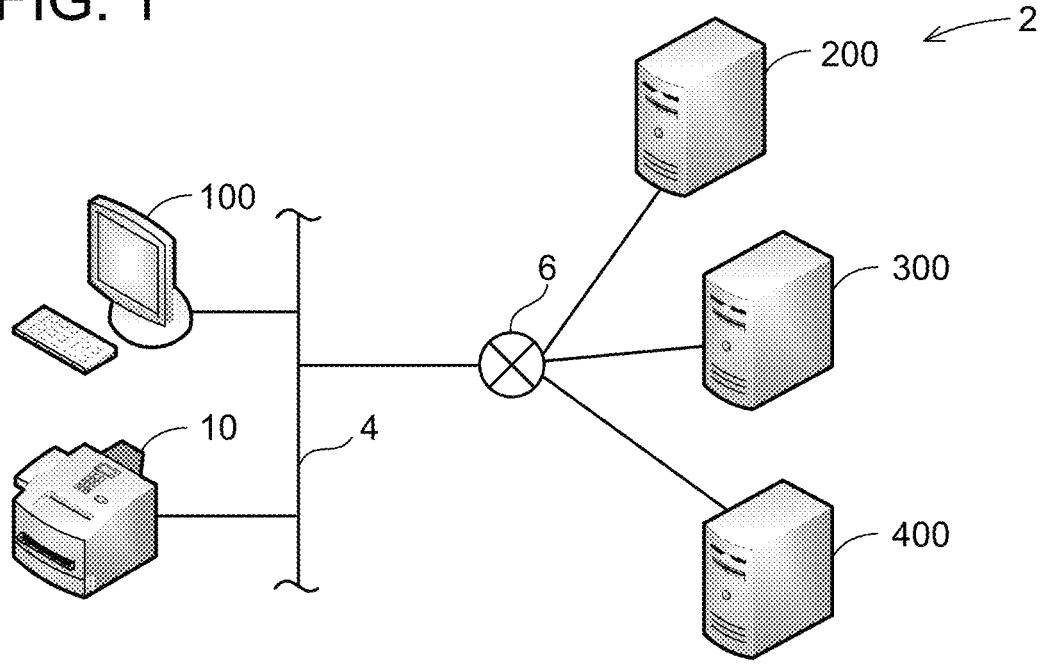
FIG. 1 is a conceptual diagram of a communication system.

Configuration of Communication System 2; FIG. 1

A communication system 2 comprises a multifunctional device 10, a terminal device 100, a parameter provision server 200, an authentication server 300, and an e-mail server 400. The multifunctional device 10 has multiple functions, including a printing function and a scanning function. The multifunctional device 10 is, for example, a peripheral device of the terminal device 100. Hereinafter, the multifunctional device 10 is referred to as the MFP 10. The terminal device 100 is, for example, a smartphone, a tablet PC, a laptop PC, or a desktop PC. The MFP10 and the terminal device 100 are connected to a LAN 4. The LAN 4 is wired or wireless. The terminal device 100 communicates with the MFP 10 via the LAN 4.

The LAN 4 is connected to the Internet 6. The parameter provision server 200, the authentication server 300, and the e-mail server 400 are connected to the Internet 6. Devices connected to the LAN 4, such as the terminal device 100, communicate with devices connected to the Internet 6, such as the parameter provision server 200, via the LAN 4 and the Internet 6.

The e-mail server 400 is configured to provide an e-mail service to users. The authentication server 300 is configured to provide a device, such as the MFP 10, with a token for the device to communicate with the e-mail server. A business operator that installed the authentication server 300 is the same as a business operator that installed the e-mail server 400. In a modification, the business operator that installed the authentication server 300 may be different from the business operator that installed the e-mail server 400.

Tokens provided by the authentication server 300 are, for example, tokens according to OAuth. OAuth is an authentication scheme that uses tokens instead of account information (i.e., a user name and a password). The authentication server 300 provides a token to a device, such as the MFP 10, with the consent of user owing account information. The device uses the token to communicate with the e-mail server 400. In particular, the method of providing a token according to OAuth to a device that does not have a browser program, such as the MFP 10, is called the device flow. In this embodiment, a token is provided to the MFP 10 according to the device flow.

There can be multiple business operators that provide e-mail services. Thus, there can also be multiple e-mail servers 400 and authentication servers 300. The number of e-mail servers 400 and the number of authentication servers 300 each are not limited to one, but may be two or more.

The parameter provision server 200 is configured to provide a device such as the MFP 10 with communication parameters for communication with the authentication server 300. The business operator that installed the parameter provision server 200 is the same as the vendor of the MFP 10, and this vendor is different from the business operator that installed the authentication server 300 and the e-mail server 400. In this configuration, the vendor of the MFP 10 can manage the parameter provision server 200, and the vendor thus can add or modify communication parameters at any time. In a modification, the business operator that installed the parameter provision server 200 may be different from the vendor of a device such as the MFP 10.

Figure 2:
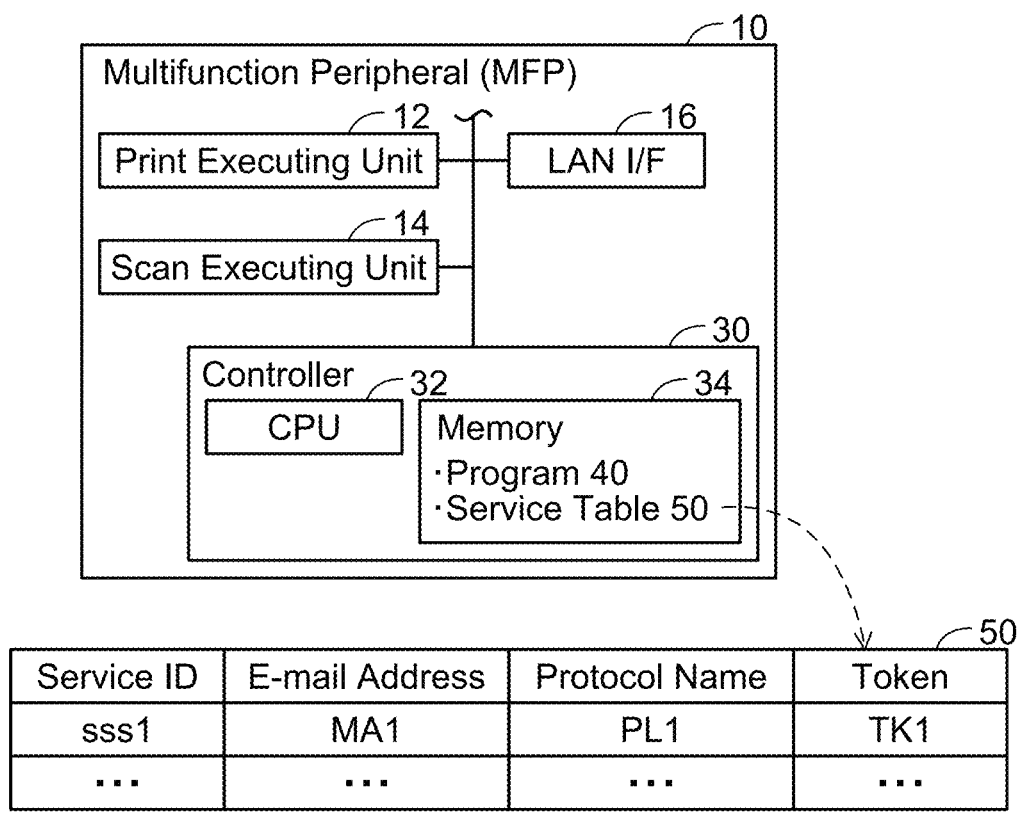
FIG. 2 is a block diagram of a multifunctional device.

Configuration of MFP 10; FIG. 2

The MFP 10 comprises a print executing unit 12, a scan executing unit 14, a LAN interface 16, and a controller 30. Hereinafter, interface is abbreviated as "I/F".

The Print executing unit 12 comprises a printing mechanism, for example, of inkjet scheme, laser scheme, or the like. The scan executing unit 14 comprises a scanning mechanism, for example, of Charge Coupled Device (CCD) image sensor, Contact Image Sensor (CIS), or the like. The LAN I/F 16 is an I/F for communication via the LAN 4 and is connected to the LAN 4.

The controller 30 comprises a CPU 32 and a memory 34. The memory 34 stores a program 40 and a service table 50. The CPU 32 executes various processes according to the program 40. The memory 34 is configured of a volatile memory, a nonvolatile memory, etc.

The service table 50 stores information for the MFP 10 to use e-mail services. The service table 50 stores a plurality of service IDs. Each service ID is an ID that identifies a corresponding service. The service table 50 stores an e-mail address, a protocol name, and a token in association with each service ID. The e-mail address is an e-mail address provided by the service identified by the associated service ID. The protocol name indicates a protocol used to execute e-mail communication using the associated e-mail address. The token is information for authenticating e-mail communication using the associated e-mail address.

For example, the MFP 10 is configured to send a scan e-mail with which scan data generated by the scan executing unit 14 is attached, by using an e-mail address stored in the service table 50.

Figure 3:
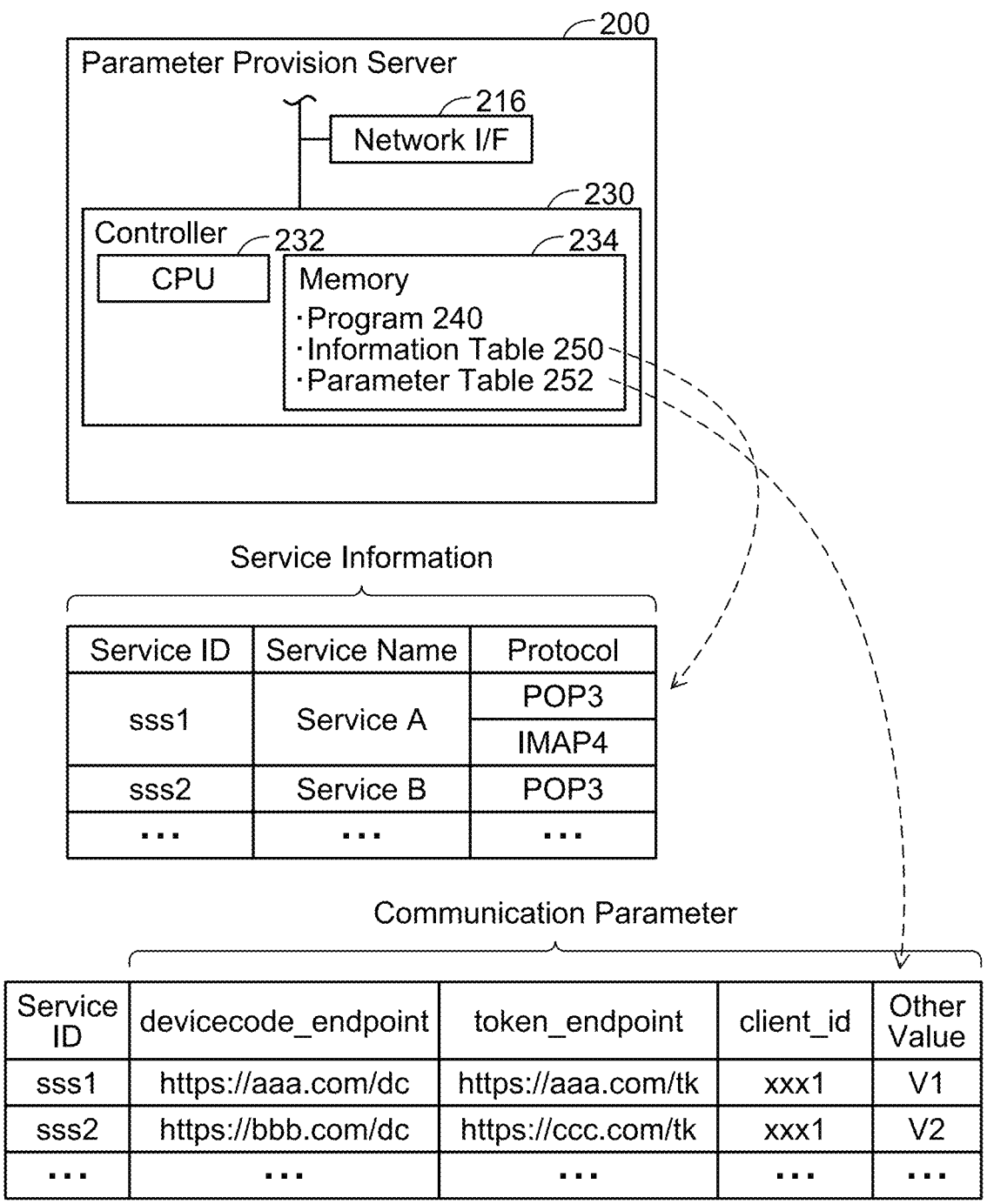
FIG. 3 is a block diagram of a parameter provision server.

Configuration of Parameter Provision Server 200: FIG. 3

The parameter provision server 200 comprises a network I/F 216 and a controller 230. The network I/F 216 is an I/F for communication via the Internet 6 and is connected to the Internet 6.

The controller 30 comprises a CPU 232 and a memory 234. The memory 234 stores a program 240, an information table 250, and a parameter table 252. The CPU 232 executes various processes according to the program 240.

The information table 250 stores multiple pieces of service information. Each service information includes a service ID, a service name of the service identified by the service ID, and a list of protocols available for the service.

The parameter table 252 stores a plurality of communication parameters. In the parameter table 252, each communication parameter is stored in associated with a corresponding service ID. Each communication parameter includes a devicecode_endpoint, a token_endpoint, and a client_id. The devicecode_endpoint is a URL that indicates a destination of a code request for requesting a code to the authentication server 300. The token_endpoint is a URL that indicates a destination of a token request for requesting a token to the authentication server 300. The client_id identifies a client. Here, the client is a vendor of a device using the device flow, such as the vendor of the MFP 10. The client_id is provided to the vendor by the authentication server 300. Each communication parameter includes a value other than the devicecode_endpoint, token_endpoint, and client_id. The other value is a fixed value, for example, scope. Scope includes a value that indicates a protocol used for e-mail communication.

Figure 4:
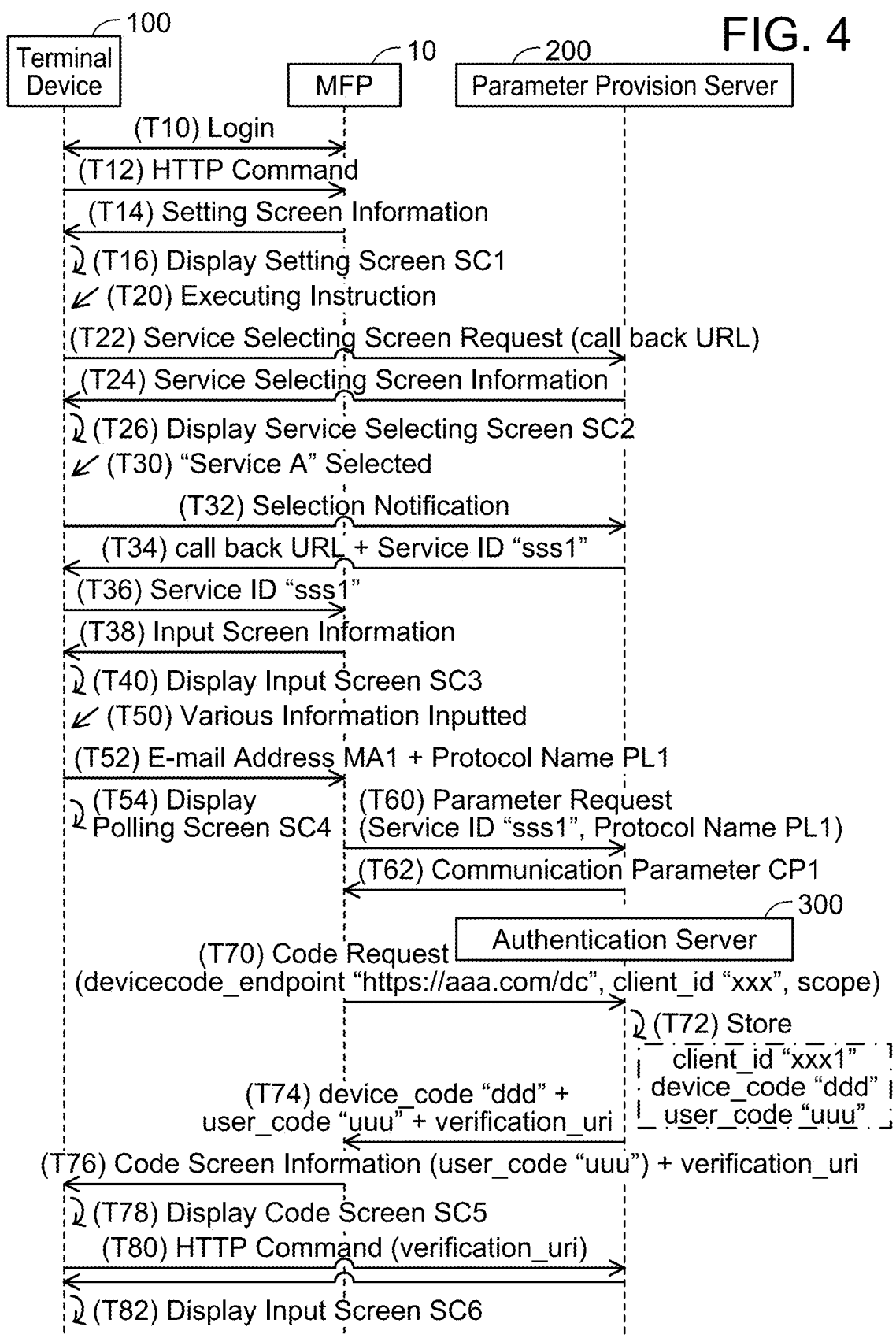
FIG. 4 is a sequence diagram showing a process for using an e-mail server.
Figure 5:
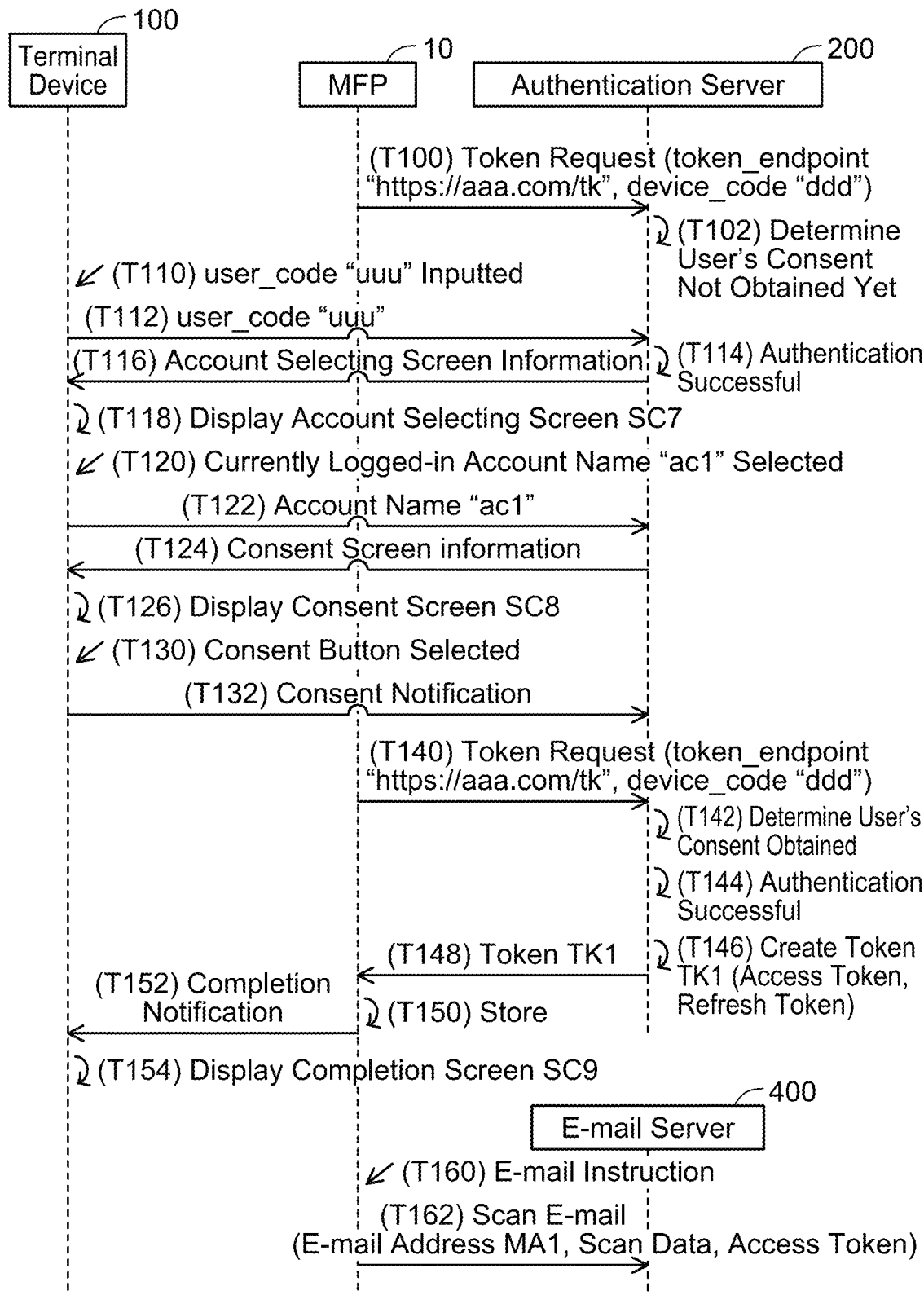
FIG. 5 is a continuation of FIG. 4.
Figure 6:
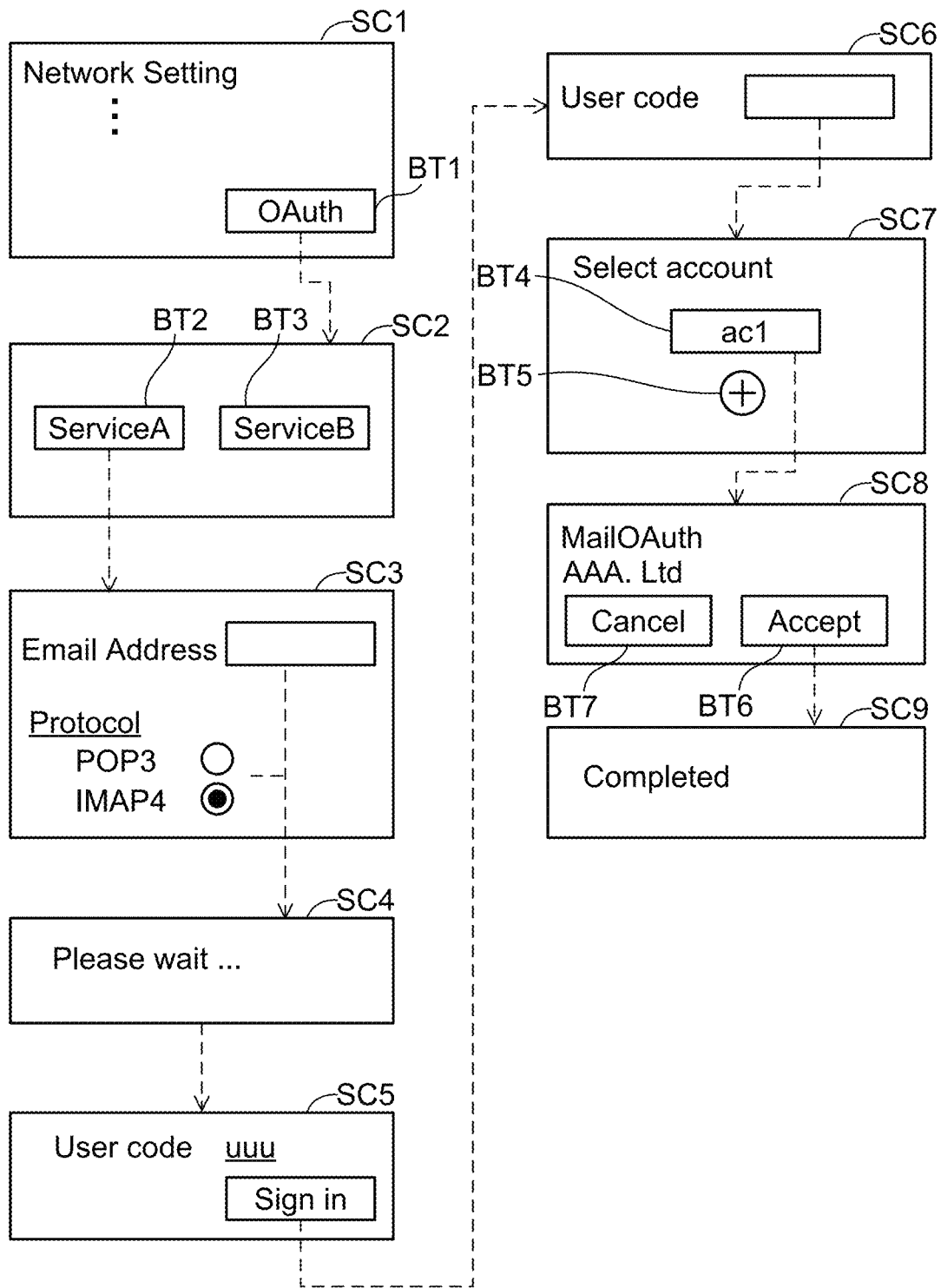
FIG. 6 is a figure showing screen transitions.

Process for Using E-mail Server 400; FIG. 4, FIG. 5, FIG. 6

Referring to FIGS. 4, 5, and 6, a process for the MFP 10 to use the e-mail server 400 is described. Hereinafter, for ease of understanding, actions executed by the CPU 32 according to the program 40 are described with the MFP 10 as the subject of actions, instead of with the CPU 32 as the subject of actions. For the parameter provision server 200 as well, actions are described with the parameter provision server 200 as the subject of actions, instead of with the CPU 232 as the subject of actions. Further, since all communications between the MFP 10 and the other devices are executed via the LAN I/F 16 and the LAN 4, phrases "via the LAN I/F 16" and "via the LAN 4" are omitted hereinafter. In addition, since all communications between the parameter provision server 200 and the other devices are executed via the network I/F 216 and the Internet 6, phrases "via the network I/F 216" and "via the Internet 6" are omitted hereinafter.

In addition to the printing function and the scanning function, the MFP 10 also has a server function of operating as a server. The MFP 10 provides, using the server function, a setting screen to the terminal device 100 in response to receiving a request from the terminal device 100 operating as a client. For example, a user can change the settings, for example, network settings, of the MFP 10 by operating the setting screen provided by the MFP 10.

The terminal device 100 attempts to login to the server function of the MFP 10 using account information for login to the server function of the MFP 10. In response to the terminal device 100 successfully logging into the server function of the MFP 10 in T10, the terminal device 100 sends an HTTP command to the MFP 10 in T12. HTTP is Hyper Text Transfer Protocol. Processes executed by the terminal device 100 in FIGS. 4 and 5 are executed according to a browser program installed in the terminal device 100.

In T14, the terminal device 100 receives setting screen information from the MFP10 as a response to the HTTP command of T12.

In T16, the terminal device 100 displays a setting screen SC1 corresponding to the setting screen information. As shown in FIG. 6, the setting screen SC1 includes a button BT1 for instructing execution of the device flow according to OAuth.

In response to detecting selection of the button BT1 in the setting screen SC1 in T20, the terminal device 100 sends a service selecting screen request to the parameter provision server 200 in T22. The service selecting screen request is a signal for requesting service selecting screen information corresponding to a service selecting screen SC2 shown in FIG. 6. The service selecting screen request includes a call back URL. The call back URL indicates a forwarding destination of information to be received from the parameter provision server 200.

In T24, the terminal device 100 receives the service selecting screen information from the parameter provision server 200 as a response to the service selecting screen request. The service selecting screen information includes a list of service names stored in the information table 250. In T26, the terminal device 100 displays the service selecting screen SC2. As shown in FIG. 6, the service selecting screen SC2 includes buttons to select one service from a plurality of services. For example, a service with a service name "ServiceA" is an e-mail service provided by a first business operator, and a service with a service name "ServiceB" is an e-mail service provided by a second business operator different from the first business operator. For example, the service selecting screen SC2 includes a button BT2 for selecting the service name "ServiceA" and a button BT3 for selecting the service name "ServiceB". In the present case, the service with the service name "ServiceA" is provided by the e-mail server 400.

In response to detecting selection of the button BT2 in the service selecting screen SC2 in T30, the terminal device 100 sends a selection notification indicating that the service name "ServiceA" has been selected to the parameter provision server 200 in T32.

In response to receiving the selection notification from the terminal device 100 in T32, the parameter provision server 200 obtains from the information table 250 a service ID "sss1" associated with the service name "ServiceA" indicated by the selection notification. In T34, the parameter provision server 200 sends the service ID "sss1" obtained from the information table 250 and the call back URL received from the terminal device 100 in T22 to the terminal device 100.

In response to receiving the service ID "sss1" and the call back URL from the parameter provision server 200 in T34, the terminal device 100 accesses the MFP10 by using the call back URL in T36. The terminal device 100 then forwards the service ID "sss1" to the MFP 10.

In response to receiving the service ID "sss1" from the terminal device 100 in T36, the MFP 10 sends input screen information corresponding to an input screen SC3 shown in FIG. 6 to the terminal device 100 in T38.

In response to receiving the input screen information from the MFP 10 in T38, the terminal device 100 displays the input screen SC3 in T40. As shown in FIG. 6, the input screen SC3 includes an input field for input of an e-mail address and an input field for input of a protocol name indicating a protocol to be used for communication of the e-mail address. In the present case, the account information of the user of the terminal device 100 has been already registered in the e-mail server 400. Furthermore, the e-mail server 400 has already provided an e-mail address MA1 to be used by the user of the terminal device 100.

In response to detecting input of the e-mail address MA1 and a protocol name PL1 in the input screen SC3 in T50, the terminal device 100 sends the e-mail address MA1 and the protocol name PL1 to the MFP10 in T52. After the communication of T52, the terminal device 100 displays a polling screen SC4 (see FIG. 6) indicating that the terminal device 100 is waiting for a response from the MFP 10.

In response to receiving the e-mail address MA1 and the protocol name PL1 from the terminal device 100 in T52, the MFP 10 sends a parameter request for requesting a communication parameter to the parameter provision server 200 in T60. The parameter request includes the service ID "sss1" received from the terminal device 100 in T36 and the protocol name PL1 received from the terminal device 100 in T52.

In response to receiving the parameter request from the MFP 10 in T60, the parameter provision server 200 obtains from the parameter table 252 a communication parameter CP1 associated with the service ID "sss1" included in the parameter request. In the present case, as shown in FIG. 3, the communication parameter CP1 includes a devicecode_endpoint "https:/aaa.com/dc", a token_endpoint "https:/aaa.com/tk", a client_id "xxx1", and another value V1. In T62, the parameter provision server 200 sends the communication parameter CP1 obtained from the parameter table 252 to the MFP 10. As a result, the MFP 10 can execute device flow processes from T70 onwards by using the communication parameter CP1. If the service name "Service B" is selected by the user in T30, the parameter provision server 200 receives a parameter request including a service ID "sss2" from the MFP10 in T60. In this case, in T62, the parameter provision server 200 sends a communication parameter associated with the service ID "sss2" to the MFP 10. Thus, the communication parameter corresponding to the service selected by the user can be provided to the MFP 10.

In T70, the MFP 10 sends the authentication server 300 a code request that includes the devicecode_endpoint "https:// aaa.com/dc" included in the communication parameter CP1 as the destination. The code request further includes the client_id "xxx1" included in the communication parameter CP1 and a scope which is a value indicating the protocol name PL1 selected in T50.

In response to receiving the code request from the MFP 10 in T70, the authentication server 300 generates a device-_code "ddd" and a user_code "uuu". The device_code "ddd" is a code for authenticating a sender device of a token request. The user_code "uuu" is a code for authenticating a user who consents to provision of a token. In T72, the authentication server 300 stores the device_code "ddd" and the user_code "uuu" in association with the client_id "xxx1" included in the communication parameter CP1. In T74, the authentication server 300 sends the device_code "ddd" and the user_code "uuu" to the MFP 10. In T74, the authentication server 300 further sends a verification_uri to the MFP 10. The verification_uri is a URI for receiving screen information corresponding to an input screen SC6 shown in FIG. 6 from the authentication server 300.

In response to receiving the device_code "ddd", etc. from the authentication server 300 in T74, the MFP 10 sends code screen information and the verification_uri to the terminal device 100 in T76. The code screen information is information corresponding to a code screen SC5 shown in FIG. 6. The code screen information includes the user_code "uuu".

In response to receiving the code screen information, etc. from the MFP 10 in T76, the terminal device 100 displays the code screen SC5 instead of the polling screen SC4 in T78. As shown in FIG. 6, the code screen SC5 displays a character string indicating the user_code "uuu". Thus, the user of the terminal device 100 is able to know the user_code "uuu".

In T80, the terminal device 100 sends the authentication server 300 an HTTP command that includes the verification_uri received from the MFP 10 in T76 as the destination. The terminal device 100 receives screen information corresponding to an input screen SC6 from the authentication server 300 as a response to the HTTP command. The terminal device 100 then displays the input screen SC6 in T82. The input screen SC6 is displayed in a different window from the code screen SC5. As shown in FIG. 6, the input screen SC6 includes an input field for input of a user_code.

FIG. 5 is a process executed following T82 in FIG. 4. After receiving the device_code "ddd" from the authentication server 300 in T74, the MFP 10 starts periodically sending a token request to the authentication server 300 in T100 of FIG. 5. The token request includes the token_endpoint "https://aaa.com/tk" included in the communication parameter CP1 as the destination. The token request further includes the device_code "ddd".

In response to receiving the token request from the MFP 10 in T100, the authentication server 300 determines in T102 whether the user has consented to provision of a token. In the present case, the timing of T100 is before the user_code "uuu" is input to the input screen SC6 in T110. Therefore, at this time, the authentication server 300 determines in T102 that the user has not consented to provision of a token. In T102, the authentication server 300 thus does not provide a token to the MFP 10.

The user sees the code screen SC5 displayed in T78 of FIG. 4 and inputs the user_code "uuu" displayed in the code screen SC5 to the input screen SC6.

In response to detecting the input of the user_code "uuu" to the input screen SC6 in T110, the terminal device 100 sends the user_code "uuu" to the authentication server 300 in T112. As a result, the authentication server 300 authenticates the user_code "uuu" in T114. In the present case, the authentication of the user_code "uuu" succeeds.

Once the authentication of the user_code "uuu" succeeds, the terminal device 100 receives account selecting screen information corresponding to an account selecting screen SC7 shown in FIG. 6 from the authentication server 300 in T116. The terminal device 100 displays the account selecting screen SC7 in T118.

In the present case, the terminal device 100 is logged in the authentication server 300 using account information including an account name "ac1". In a modification, the terminal device 100 may be logged in the e-mail server 400 using the account information including the account name "ac1". The account name "ac1" is an account name assigned to the user of the terminal device 100. As shown in FIG. 6, the account selecting screen SC7 includes a button BT4 for selecting the logged-in account name "ac1". The account selecting screen SC7 further includes a button BT5 for login with an account name different from the logged-in account name "ac1". In the present case, the user selects the button BT4 in the account selecting screen SC7.

In response to detecting selection of the button BT4 in the account selecting screen SC7 in T120, the terminal device 100 sends the account name "ac1" indicated by the button BT4 to the authentication server 300 in T122. If the user selects the button BT5 in the account selecting screen SC7, the terminal device 100 logs into the authentication server 300 using an account name different from the account name "ac1". The terminal device 100 then sends the different account name to the authentication server 300 in T122. Further, If the terminal device 100 does not log into the authentication server 300, processes of T122 onward are not executed, so that a token is not provided to the MFP 10. Thus, according to OAuth, a token is provided to the MFP 10 on the condition that the terminal device 100 is logged in either the authentication server 300 or the e-mail server 400 using predetermined account information.

In response to receiving the account name "ac1" from the terminal device 100 in T122, the authentication server 300 sends a consent screen information corresponding to a consent screen SC8 shown in FIG. 6 to the terminal device 100 in T124. As a result, in T126, the terminal device 100 displays the consent screen SC8.

The consent screen SC8 is a screen for obtaining consent from the user who possesses the account information including the account name "ac1". The consent screen SC8 displays the name of firmware of the MFP 10 and a name "AAA.Ltd" of the vendor of the MFP 10, which is the client indicated by the client_id "xxx1" included in the code request in T70. The name of firmware of the MFP 10 is registered in association with the client_id "xxx1" in the authentication server 300. The consent screen SC8 includes a consent button BT6 for obtaining consent for provision of a token from the user and a cancel button BT7. In the present case, the user selects the consent button BT6 in the consent screen SC8.

In response to detecting the selection of the consent button BT6 in the consent screen SC8 in T130, the terminal device 100 sends a consent notification notifying that the consent button BT6 has been selected to the authentication server 300 in T132.

T140 is the same as T100. The timing of T140 is after the receipt of the consent notification in T132. Therefore, in T142, the authentication server 300 determines that the consent for provision of a token has been obtained from the user.

In T144, the authentication server 300 authenticates the device_code "ddd" included in the token request. In the present case, the authentication of the device_code "ddd" succeeds.

In following T146, the authentication server 300 creates a token TK1. The authentication server 300 stores the created token TK1 in association with the logged-in account name "ac1". Here, the token TK1 includes an access token and a refresh token. The refresh token is used to recreate the access token.

In T148, the authentication server 300 sends the token TK1 to the MFP 10. As a result, the MFP 10 stores the token TK1 in the service table 50 in the memory 34 in T150. As shown in FIG. 2, in the service table 50, the token TK1 is associated with the service ID "sss1", the e-mail address MA1, and the protocol name "PL1".

In response to receiving the token TK1 from the authentication server 300 in T148, the MFP 10 sends the terminal device 100 a completion notification indicating that the receipt of the token TK1 is completed in T152. The terminal device 100 then displays a completion screen SC9 indicating that the receipt of the token TK1 is completed in T154. The user sees the completion screen SC9 and is able to know that the device flow executed according to the instruction of T20 in FIG. 4 is completed.

For example, when the MFP 10 detects an instruction to send a scan e-mail in T160, the MFP 10 sends a scan e-mail addressed to the e-mail address MA1 in the service table 50 to the e-mail server 400 in T162. The scan e-mail includes the access token in the service table 50. The e-mail server 400 authenticates the sender of the scan e-mail by using the access token included in the scan e-mail. In the present case, the authentication succeeds and the e-mail server 400 stores the scan e-mail. The scan e-mail stored in the e-mail server 400 is viewed by the mailer to which the e-mail address MA1 is set Effects of Embodiment According to the configuration of the present embodiment, the MFP 10 receives the communication parameter CP1 from the parameter provision server 200 (T62 in FIG. 4) and sends the token requests to the authentication server 300 by using the communication parameter CP1 (T100 and T140 in FIG. 5). That is, the communication parameter CP1 need not to be stored in advance in the MFP 10 as long as it is stored in the parameter provision server 200. The token TK1 can be obtained from the authentication server 300 without providing a storage area in the MFP 10 to store the communication parameter CP1 in advance.

In particular, there may be multiple business operators that provide e-mail services. In this case, data volume in the parameter table 252 is increased as the number of such business operators is increased. The memory capacity of the memory 34 of the MFP 10 is less than that of the memory 234 of the parameter provision server 200. The token TK1 can be obtained from the authentication server 300 without storing the parameter table 252 in the memory 34 of the MFP 10, which has a relatively small memory capacity. Further, for example, even if new business operators start providing their services after the MFP 10 has been shipped from its vendor, the MFP 10 can receive communication parameters corresponding to the services of such business operators from the parameter provision server 200, so that the user of the MFP 10 can use these services provided by the business operators. The vendor also can register the communication parameters corresponding to the new services in the parameter provision server 200.

Correspondence Relationships

The MFP 10 and the terminal device 100 are examples of "communication device" and "terminal device", respectively. The parameter provision server 200, the authentication server 300, and the e-mail server 400 are examples of "specific server", "authentication server", and "service server", respectively. The e-mail service is an example of "specific service". The communication parameter CP1 is an example of "parameter". The HTTP command in T12 of FIG. 4 is an example of "predetermined signal". The parameter request in T60 is an example of "parameter request". The service ID "sss1" and the service ID "sss2" are examples of "first identification information" and "second identification information", respectively. The user_code "uuu" and the code request in T70 are examples of "user code" and "user code request", respectively. The token requests in T100 and T140 of FIG. 5 and the token TK1 are examples of "authentication information request" and "authentication information", respectively. The account name "ac1" is an example of "specific account information". The scan data is an example of "target data". The input screen SC3, the code screen SC5, and the input screen SC6 in FIG. 6 are examples of "first input screen", "code screen", and "second input screen", respectively.

T60 and T62 in FIG. 4 are examples of "send a parameter request" and "receive the parameter from the specific server", respectively. T100 and T140 in FIG. 5 are examples of "send an authentication information request". T148 and T162 are examples of "receive the authentication information from the authentication server", respectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Modification 1

The "communication device" is not limited to the MFP 10, but may be, for example, a printer, scanner, a PC, or the like.

Modification 2

The "specific service" is not limited to an e-mail service, but may be, for example, a service of providing contents for images to be printed, a storage service of storing image data, or a social networking service (SNS). Here, the contents mean, for example, a template for a postcard image. For example, if the "specific service" is the service of providing contents, contents data is an example of "target data". For example, if the "specific service" is the storage service, the input screen SC3 may not be displayed. In this modification, the "first input screen" may be omitted.

Modification 3

The input screen SC3 may not include the input field for input of an e-mail address. Alternatively, the input screen SC3 may not include the input field for input of a protocol name.

Modification 4

When there is only a single business operator that provides an e-mail service, the parameter request in FIG. 4 may not include the service ID "sss1". In this modification, the "identification information" may be omitted.

Modification 5

T70 to T82 in FIGS. 4 and T110 to T114 in FIG. 5 may not be executed. In this modification, the "user code request" may be omitted.

Modification 6

In the above embodiment, the processes in FIGS. 3 to 6 are realized by the CPUs 32 and 232 executing the programs 40 and 240. Alternatively, any of these processes may be realized by hardware such as a logic circuit.

What is claimed is:

1. A communication device, comprising:
   a memory;
   a processor connected to the memory, the processor configured to:
   in response to receiving a predetermined signal from a terminal device, send a parameter request to a specific server, wherein the parameter request is for requesting a parameter for communication with an authentication server, the specific server is different from the authentication server, the authentication server is configured to supply the communication device with authentication information, which is a token according to OAuth, for the communication device to communicate with a service server, and the service server is configured to supply a specific service to an user of the communication device;
   receive the parameter from the specific server as a response to the parameter request;
   send an authentication information request for requesting the authentication information to the authentication server by using the parameter received from the specific server;
   in a case where a specific condition is met, receive the authentication information from the authentication server as a response to the authentication information request, wherein the specific condition is that the terminal device, which is a sender of the predetermined signal, is logged in at least one of the authentication server or the service server by using specific account information, and wherein in a case where the specific condition is not met, the authentication information is not received from the authentication server; and
   communicate target data with the service server by using the authentication information received from the authentication server.

2. The communication device according to claim 1, wherein
   the specific server is configured to provide an e-mail to the user as the specific service, the processor is further configured to:
send input screen information corresponding to a first input screen to the terminal device, wherein the first input screen includes an input field for input of protocol information indicating a protocol used in communication of the e-mail; and
send the protocol information inputted to the first input screen to the specific server.

3. The communication device according to claim 2, wherein
the first input screen further includes an input field for input of an address of the e-mail.

4. The communication device according to claim 1, wherein
the specific server stores a plurality of parameters including a first parameter corresponding to a first service and a second parameter corresponding to a second service,
the processor is further configured to receive identification information from the terminal device, wherein the identification information identifies the specific service selected at the terminal device,
in a case where first identification information which is the identification information identifying the first service is received, the processor is configured to send the parameter request including the first identification information to the specific server, and receives the first parameter corresponding to the first service from the specific server, and
in a case where second identification information which is the identification information identifying the second service is received, the processor is configured to send the parameter request including the second identification information to the specific server, and receives the second parameter corresponding to the second service from the specific server.

5. The communication device according to claim 1, wherein
the processor is further configured to:
send a user code request for requesting a user code to the authentication server by using the parameter received from the specific server;
receive the user code from the authentication server as a response to the user code request; and
send code screen information corresponding to a code screen to the terminal device, wherein the code screen displays the user code received from the authentication server, the authentication server causes the terminal device to display a second input screen, the second input screen includes an input field for input of the user code, and the authentication server executes authentication of the user code inputted in the second input screen, and
the specific condition is that the terminal device is logged in at least one of the authentication server or the service server by using the specific account information and the authentication by the authentication server is successful.

6. The communication device according to claim 1, wherein
the processor is configured to send the parameter request to the specific server after the terminal device has logged in the communication device.

7. The communication device according to claim 1, wherein
the service server is different from the authentication server, and
a business operator that has installed the service server is identical to a business operator that has installed the authentication server.

8. The communication device according to claim 1, wherein
a business operator that has installed the specific server is identical to a vendor of the communication device.

9. A non-transitory computer-readable recording medium storing computer-readable instructions for a communication device, wherein the computer-readable instructions, when executed by a processor of the communication device, cause the communication device to:
in response to receiving a predetermined signal from a terminal device, send a parameter request to a specific server, wherein the parameter request is for requesting a parameter for communication with an authentication server, the specific server is different from the authentication server, the authentication server is configured to supply the communication device with authentication information, which is a token according to OAuth, for the communication device to communicate with a service server, and the service server is configured to supply a specific service to an user of the communication device;
receive the parameter from the specific server as a response to the parameter request;
send an authentication information request for requesting the authentication information to the authentication server by using the parameter received from the specific server;
in a case where a specific condition is met, receive the authentication information from the authentication server as a response to the authentication information request, wherein the specific condition is that the terminal device, which is a sender of the predetermined signal, is logged in at least one of the authentication server or the service server by using specific account information, and wherein in a case where the specific condition is not met, the authentication information is not received from the authentication server; and
communicate target data with the service server by using the authentication information received from the authentication server.

* * * * *